Dec. 26, 1967 C. J. T. YOUNG 3,360,659
COMPENSATED OPTICAL SCANNING SYSTEM
Filed April 23, 1964 3 Sheets-Sheet 3
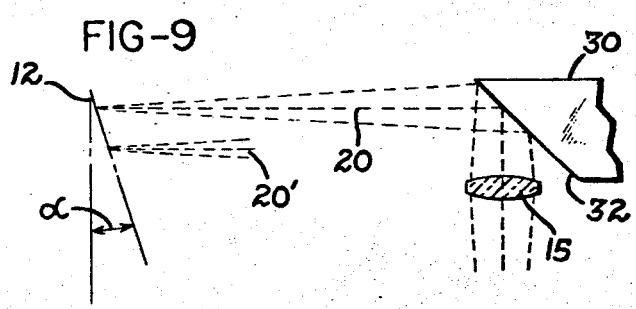
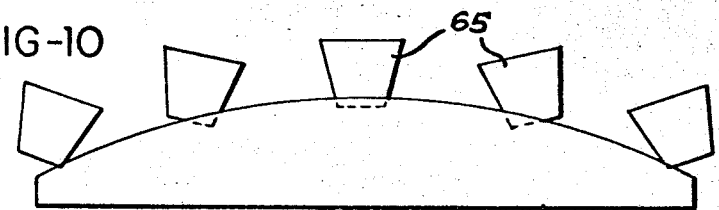
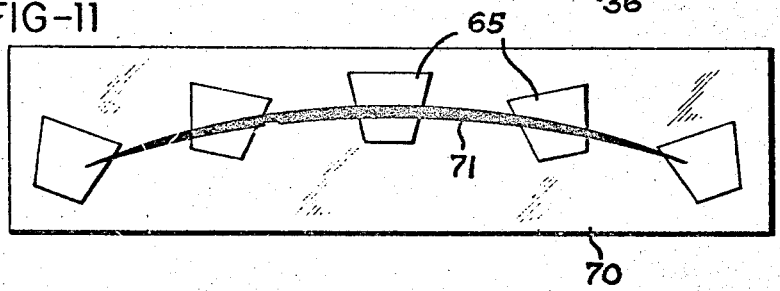
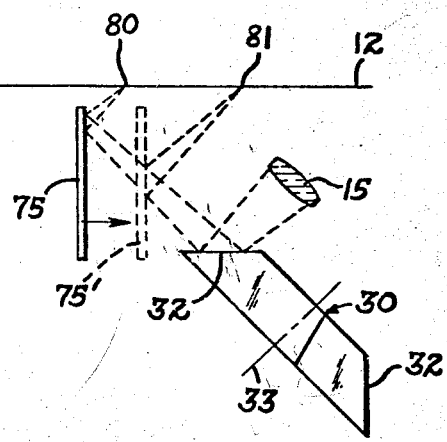
INVENTOR.
CLINTON J.T. YOUNG
BY
Marchal, Biebel, French & Bugg
ATTORNEYS United States Patent Office 3,360,659
Patented Dec. 26, 1967

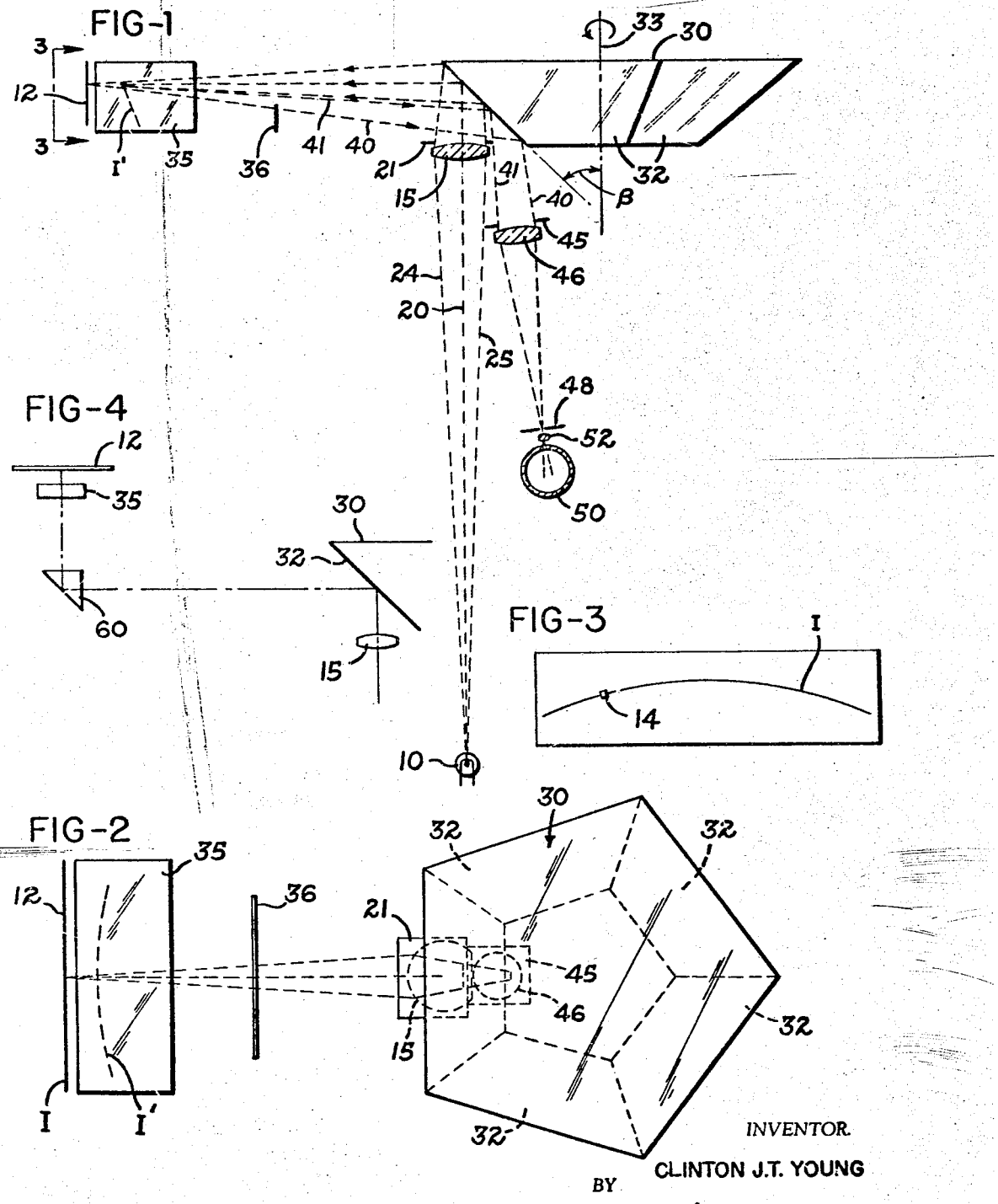

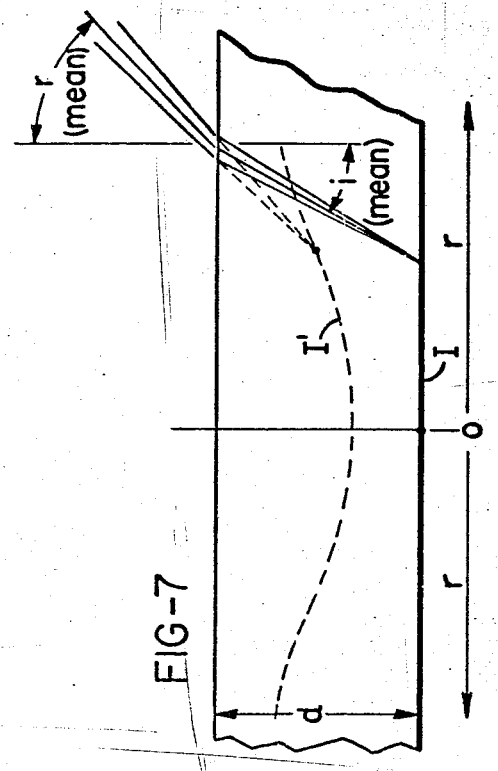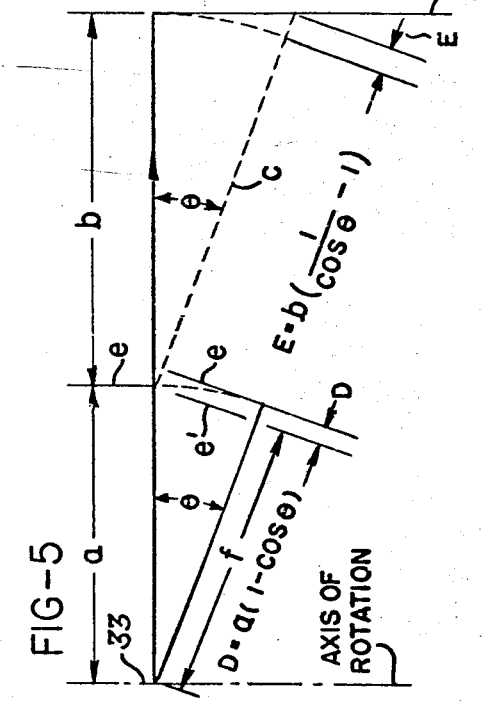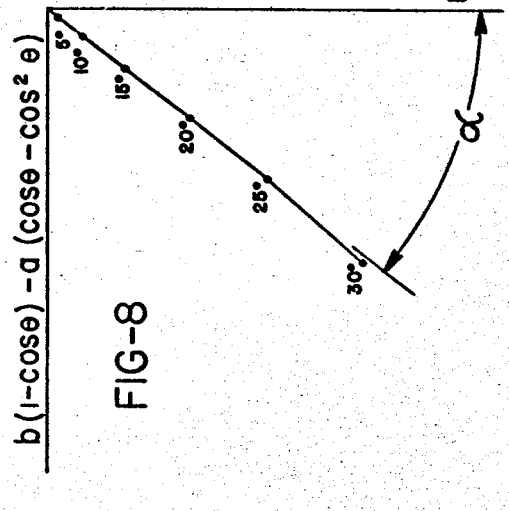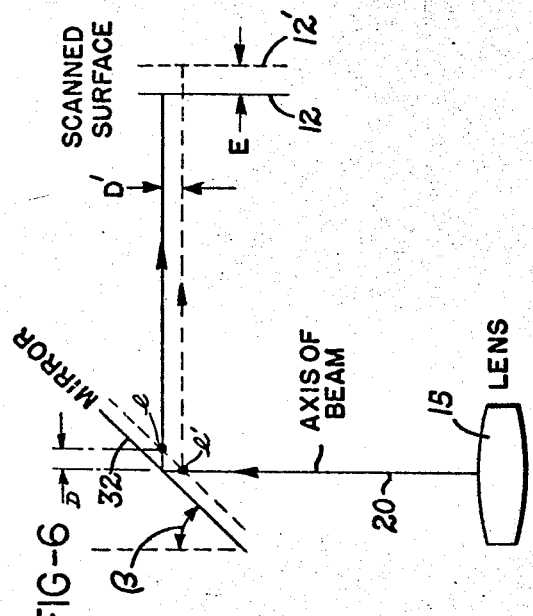

3,360,659
COMPENSATED OPTICAL SCANNING SYSTEM
Clinton J. T. Young, Alexandria, Va., assignor to Outlook Engineering Corporation, Alexandria, Va., a corporation of Virginia
Filed Apr. 23, 1964, Ser. No. 362,102
14 Claims. (Cl. 250—236)

ABSTRACT OF THE DISCLOSURE

An optical scanning system is disclosed for either flying spot or flying image types of scanning in which reflector surfaces rotate through a light path at an angle to the axis of the light rays impinging thereon and in which the point of incidence measured from the radius of rotation and the distance between this point of incidence and the object or surface being scanned is such that there is no substantial change in overall light path length throughout the scan as the mirror structure rotates.

---

This invention relates to an optical scanning system for defining a scan element and causing the element to move in a path across a scanned surface and for maintaining the focus of the element of the scan throughout the length of the scan.

The apparatus of this invention has particular applicability for use as the optical scanning portion of a device for measuring variations in reflectivity over an area, such as described and claimed in the copending application of Young (Ser. No. 361,958) filed concurrently herewith.

The most common mechanical-optical scanning system is one in which there is a rotating mirror structure, sometimes referred to as a drum, on which mirrors are arranged as faces of a regular prism rotating about an axis. Light passes through a positive lens, falls on one of the mirrors of the drum, and is reflected to the scanned surface at a spot, the position of which moves or scans as the mirror rotates. Each mirror of the drum contributes one line of scan. Ideally, the light should be focused on the surface being scanned, but if the surface is a plane, there arises the difficulty of maintaining the focus throughout the length of the scan, since the distance along the optical path from the lens to the scanned surface changes throughout the scan so that the correct focus can generally be obtained only at one or two points. This results in a loss of potential resolution everywhere else in the scan.

It is an important object of this invention to provide a scanning system which achieves substantial equality of focus over scans of considerable angular extent.

A further object of this invention is the provision of a compact and inexpensive scanning system characterized by the few number of parts which are required in order to maintain focus, requiring no collimating lenses, and providing a curved scan in a plane.

Another important object of this invention is to provide a rapid scanner having a rotating mirror structure with a plurality of planar reflecting surfaces wherein the change in the length of the optical path on one side of the mirror is substantially offset by a compensating change in the length of the path on the other side of the mirror throughout the length of the scan.

A still further object of this invention is the provision of a mechanical-optical scanning system wherein a scanner includes a planar reflecting surface effectively inclined at an angle to the axis of rotation for directing an axial beam generally radially of the axis of rotation.

Another object of this invention is the provision of a block or a relatively thick slab or plate of light conducting material positioned in the optical path between the rotating mirror structure and the surface being scanned and having a higher index of refraction than the surrounding medium for compensating for a curved or concave trace away from a desired plane by providing a trace lying substantially in the desired plane.

A further object of this invention is the provision of a compensating mask within the optical path of the scanning system between the rotating mirror structure and the object being scanned for providing compensation for the varying efficiency of the optical system through the scan.

A still further object of this invention is the provision of an optical scanning system which includes a reading system operating through the same rotating mirror structure as the scanning system for providing an image to a transducer which remains stationary throughout the scan but which varies in accordance with a light absorbing characteristic of the object.

These and other objects of the invention will be apparent from the following description, the accompanying drawings, and the appended claims.

In the drawings:

FIG. 1 is an elevational, partially schematic view of a scanning system constructed according to this invention;

FIG. 2 is a plan view of the scanning system of FIG. 1;

FIG. 3 is an elevational view of one line of the trace or scan effected by this invention;

FIG. 4 is a fragmentary elevational view similar to FIG. 1, showing a slightly modified form of the invention;

FIGS. 5 and 6 are respectively plan and elevational schematic diagrams of the invention showing the principles of operation each being drawn to a common axis of rotation;

FIG. 7 is a schematic diagram showing the principle of operation of the compensating block;

FIG. 8 is a diagram showing a further arrangement for compensation;

FIG. 9 is a fragmentary view similar to FIG. 1 showing the application of the compensating arrangement of FIG. 8;

FIG. 10 is a front elevational view of one form of the compensating mask;

FIG. 11 is a view similar to FIG. 10 showing a modified form of the mask; and

FIG. 12 is a diagram showing an arrangement for effecting a scan in a second dimension wherein only one component of the system is moved.

Referring to the figures of the drawings, which illustrate a preferred embodiment of the invention, a scanning system constructed according to this invention is illustrated in FIGS. 1 and 2 as including a point source of light 10 and an object 12 which is to be scanned and intelligence derived therefrom of its characteristics. The object 12 may consist of a window forming a planar surface against which material is placed to be scanned. It is assumed that the material to be scanned at the object 12 is opaque so that the information required will be contained in the light which is reflected from it. Arrangements for scanning transparent or translucent material will be apparent to those skilled in the art.

Means for projecting an image point of the source 10 defining a scan element 14 (FIG. 3) includes a positive lens 15 which is interposed within the light path from between the source 10 and the object 12. The dimensions of the source 10 and the magnification, determined by the ratios of distances from the source 10 to the lens 15, and from the lens 15 to the object 12, are chosen to provide the desired size of scanning spot or element 14.

The source 10 may be a primary source or an image, an illuminated aperture, or any other source having suitable characteristics. The axial ray of light between the source and the lens 15 is designated by the heavy dashed line 20, and the limits of the illuminating beam are defined by a mask 21, adjacent the lens 15. The mask 21 assures that all of the rays are limited to those which will be intercepted by a single rotating mirror throughout the required angle of scan so that the amount of light does not vary through the scan and introduce an undesirable variation of response. The limiting rays are designated or outlined by the broken lines 24 and 25 in FIG. 1.

Rotating reflector means for effecting a trace or scan image I (FIG. 3) interposed in the light path defined by the limiting rays 24 and 25 includes a rotating mirror structure 30 having a plurality of separate reflecting portions or mirror surfaces 32 arranged symmetrically about an axis of rotation 33, as shown in FIGS. 1 and 2. The planar mirror surfaces 32 are effectively inclined to the axis of rotation. Also, the axis 33 is generally parallel to or aligned with the axial ray 20, or some other ray from the lens 15 so that the intersecting inclined mirror surfaces successively move through the path or rays defined by lines 24 and 25 and direct the rays incident from the lens 15 generally outwardly or radially to the object 12, for effective successive scans along a curved image path I. In the preferred embodiment of the invention, the individual mirror elements or surfaces 32 intersect the axis of rotation 33 at a forty-five degree angle, so that the axial ray 20 is reflected through an angle of ninety degrees. Although this arrangement is preferred, it is not to be considered as limiting, since the teaching of this invention may be applied to other mirror angles and beam or ray incident and reflecting angles by those skilled in the art.

The rotating mirror structure 30 is shown in the preferred embodiment as having five geometrically identical reflecting surfaces 32, although it is within the scope of this invention to employ either a greater or fewer number of such surfaces arranged about the axis 33. The reflected rays from the mirror surfaces may be applied to the object 12 through a compensating block 35 and a compensating mask 36, for purposes which will subsequently be explained.

Utilization means for reading the reflected intensity of the scan element 14 may include apparatus for the utilization of a portion of the reflected light, defined in the rays 40 and 41. The returning rays are directed to an apertured mask 45 by another portion of the active mirror surface 32. The mask 45 serves a function analogous to that of the mask 21. A lens 46 is positioned so that it focuses this return or reflected light on an aperture within a mask 48 onto a photoelectric converter or transducer, such as the phototube 50.

If the invention were being used in its flying-image form, that is with generally illumination of the object 12, the mask 48 could be used to define the scan element 14. The mask 48 is still desirable with flying-spot illumination because it helps to exclude stray light generally from the phototube 50, and it helps to prevent over-illumination of the tube 50 if the removal of the material to be scanned admits strong general illumination into the system. In the preferred embodiment, the aperture in the mask 48 may be a little larger than the image of the spot so as not to reduce the response of the system if the position of the image at the mask 48 is not perfectly constant.

The lens 46 is positioned with respect to the object 12 as seen reflected by the mirror 32 in order to direct onto the phototube 50 a stationary image of the flying-spot as reflected by the object 12. Accordingly, the phototube 50 may have an electric output which varies according to the changes in intensity of reflected light of the element being scanned as an indication of an optical characteristic of the object 12 being scanned, such as light absorption, or variation in light diffusing characteristics. An example is the measurement of the amount of trash in a sample of cotton.

The tube 50 is preferably a photomultiplier tube and these tubes are sensitive to variations in the distribution of light on the photocathode. Some sources 10 that may be used in the system, such as a concentrated zirconium arc lamp, are subject to wandering of the source region. In order substantially to eliminate the effects of wandering, a field lens 52 may be used between the mask 48 and the tube 50 to cause the light to fall substantially on the same region of the photocathode even though the position of the effective source 10 and therefore the position of the illuminated spot on the scanned material may vary. Such variation of the sensitivity of a photomultiplier tube is less in the central region along the tube axis, than across the axis, it may be sufficient to make lens 52 a cylindrical lens stabilizing the illuminated spot only in the direction in which motion would be disturbing to the sensitivity of the tube 50.

It should be understood that the teachings of the invention are not limited to the precise arrangement disclosed. In particular, of all the rays converging to or emanating from a point on the object 12, the choice of which rays are to be used for illumination and which are to be used for return may be made according to general considerations of design. Thus, it is obvious that the relative positions of the tube 50 and source 10 may be reversed. It is also possible to illuminate a surface generally and to receive light from a scanned spot through a defining aperture at the mask 48. Also, one may illuminate with the flying spot and expose a photomultiplier or other detector to such reflected light as might reach it without the lens 46. Either of these latter arrangements would increase the difficulty of obtaining a responsive substantially constant except for variations in the reflectivity of the object 12.

It is obvious to one skilled in the art that the scanner of this invention can be used where only illumination is required. For instance, the scanner may be used as both the scanning and the reproducing end of a facsimile system, of the type described and claimed in the copending application of Young, Ser. No. 73,282, filed Dec. 2, 1960, now Patent No. 3,120,577, issued Feb. 4, 1964. In this instance, the object 12 would become a photosensitive film or a phosphor screen, and the light source 10 could be modulated according to signal intelligence to produce on the film or phosphor a linear indication of the signal variations at the source 10.

The operation of the invention is illustrated in FIGS. 5 and 6, which are schematic plan and elevation views respectively of the scanning system each drawn to a common axis of rotation. One of the reflecting surfaces or mirrors 32 is mounted at an angle to the axis about which it rotates. Light converging from the lens 15 falls on this mirror. In FIGS. 5 and 6, for illustration, the mirror is shown at 45° to the axis of rotation 33; and the axial ray 20 is parallel to the axis of rotation so that the axial ray is reflected through an angle of 90°. This is a preferred arrangement but should not be considered limiting since the relationships affecting focus can be worked out for other angles by those skilled in geometrical construction. The solid lines represent the axial ray of light, before and after reflection, when the mirror is in position for the center of the scan. This is true when the perpendicular from the axis of rotation to a horizontal line in the mirror surface (i.e., a line parallel to the plane of FIG. 5) passes through the axis of the incident light beam.

For the purpose of illustration, the dimension $a$ is measured from the axis 33 to the region of incidence of the light beam axis before reflection. The distance $b$ is the minimum distance from the region of incidence of the axial ray 20 to the object 12 in the center of the scan. Now let the mirror be rotated through an angle $\theta$. With the incident beam 20 parallel to the axis 33 and the mirror at 45°, the reflected beam will be rotated through the same angle $\theta$ to the position shown by the dashed line in FIG. 5. The distance that the light travels from the point of reflection to the scanned surface has been increased by the amount $E=b[(1/\cos\theta)-1]$, and is derived as follows:

$\cos\theta=b/c$ by definition
$c=b/\cos\theta$
$E=c-b=b/\cos\theta-b=b[(1/\cos\theta-1]$ The horizontal element $e$ in the mirror surface that passed through the point of incidence of the ray 20 was perpendicular to the plane in the rotating structure that then contained this ray and the axis of rotation. As the mirror rotates through the angle $\theta$, this plane rotates to the position of the line dimensioned $f$ in FIG. 5; and the element $e$, remaining perpendicular to said plane, now has been displaced so that it no longer passes through the point of incidence. The parallel element $e'$ now passes through the point of incidence and, as can be seen, is nearer than $e$ to the axis of rotation by the distance $D=a(1-\cos\theta)$.

The derivation is as follows:

$f=a\cos\theta$
$D=a-f=a-a\cos\theta=a(1-\cos\theta)$.

Since the mirror 32 is inclined to the beam axis 20, the point of incidence $e$ has been lowered by the amount D', where dotted lines in FIG. 6 represent the moved position of the mirror 32 and the reflected axial ray as seen in elevation in the plane of the reflected ray. With the configuration illustrated, with the mirror at an angle $\beta=45°$, the amount D' by which the point of incidence has been lowered is equal to D, which means that the optical path before reflection has been shortened by this amount. For mirror angles $\beta$ other than forty-five degrees, it can be shown that the point of incidence $e$ is lowered (D') by the amount $D/\tan\beta$, and the path from $e'$ to the surface 12 is shortened by $E/\sin 2$.

Since the total path has been increased by E and decreased by D in the 45° example, it will remain unchanged if these two quantities are equal. By equating the expressions for E and D', one can calculate a ratio $a/b$ that will make them equal for any chosen value of $\theta$. The two expressions for E and D' are not identical, so perfect equality of path length is not preserved at other angles of rotation; but they are similar enough so that the variation in focus may be small.

For angles of rotation less than that at which the path length equals that at the center of the scan, D' minus E is positive. Therefore, if the focus is perfect at the center of the scan, the focal surface will lie to the right of the plane scanned. At greater angles of rotation, D' minus E is negative, and the focal surface is to the left. Maximum deviation of the focal surface from the plane can be minimized if perfect compensations (D'=E) is provided at an angle less than the required maximum angle of scan so that the range of deviation is divided between positive and negative amounts. This is somewhat analogous to minimizing an aberration by adjusting the parameters of a doublet lens.

Since the reflectors 32 are planes, the same compensation is provided for all rays of the same pencil, i.e., for all going to or coming from the same focal point. The system may be used either for illuminating the scanned surface with a flying spot of light or for forming an image of the scanned surface that will pass, with good maintenance of focus, over a dissecting aperture.

If structural or other considerations make it desirable to have the scanned surface in a position other than that shown in FIG. 1, a fixed mirror may be added. For example, another mirror at 45° to the axis of rotation, parallel to the rotating mirror in its mid-scan position, may be used to put the scanned surface 12 above the scanner 30 and perpendicular to the axis of rotation. Reference may be had to the arrangement of FIG. 4 including a prism 60 which accomplishes this result.

Considerations of structure and space may make it desirable to use a ratio $a/b$ different from that giving best compensation of focus. For example, limitations of the size (radius) of the rotating structure 30 of mirrors may dictate reducing $a/b$ below the ideal ratio, which will cause the focal surface to be concave toward the rotor, as shown at I' in FIG. 2, with only partial compensation. Two means of supplementary compensation or correction are described, by which the focus can be held to very small deviations.

The compensating block 35 of FIG. 7 takes advantage of the apparent displacement of an object seen through a transparent medium with a plane surface and index of refraction greater than that of the surrounding medium. If the surrounding medium is vacuum (or practically, air) and if the denser medium has thickness $d$ and index of refraction $n$, the object point will appear to lie at a depth $d/n$ when viewed from above the block perpendicularly to the surface. This displacement varies with direction, however, as shown in FIG. 7, according to Snell's law $n=\sin r/\sin i$. Here the dashed line I' shows, as a function of the angle $r$ on both sides of the perpendicular, the apparent height of a point on the bottom of the block 35 of thickness $d$. For any block thickness and index of refraction, the displacement of the image for each value of the angles $i$ and $r$ can be found by tracing rays for angles slightly greater and less than the chosen means angle $i$ with the aid of Snell's law, a procedure well known to those skilled in the optical art.

If one looks from a point above so that he looks at a line I on the bottom through a range of angles $r$ right and left, it will appear to occupy the dashed position I'. Conversely, a beam of light rotating from the same viewing position that would be focused at successive points along the dashed curve will have the focal curve displaced to a straight line or trace I along the bottom of the block 35, which may be coincident with the surface 12. The dashed curve is concave upward. Therefore, by proper choice of thickness and refraction index of the block 35, the curved trace may be rectified into substantially a planar trace and made to approximate closely the desired focal trace.

For example, with an arrangement of beam axis and mirror angle as shown in FIGS. 5 and 6, and with $a=3.5$ inches and $b=5.25$ inches, the use of a block 2.5 inches thick with an index of refraction 1.5, results in a focal trace I that remains, within a very few thousandths of an inch, in a plane through a scan of $\pm 20°$.

The foregoing description is in terms of the far side of the compensating block 35 coincident with the plane of the surface 12 being scanned, but this is not necessary. A block of the required thickness and index of refraction will have the same effect if it is moved parallel to itself to any position between the rotating mirror 32 and the scanned plane 12 where there physically is room for it. It should be noted that this means of compensating for curvature of field is not limited to use in connection with the scanning system of the present invention. It may be used with other scanning systems giving a similar curvature of field, and in other devices.

Another method of compensating for a less-than-ideal choice of the ratio $a/b$ results from the following analysis having reference to FIGS. 8 and 9: Assuming $B=45°$, the error in focus measured along the light path is E minus D, but the perpendicular displacement of the focal line from the ideal or desired image plane 12 is $E\cos\theta-D\cos\theta$. Taking the above derived expressions for D and E and multiplying each by $\cos\theta$ and taking the difference between them, results in an expression for the perpendicular distance from the ideal plane of the object 12 to focal line as follows:

$$b(1-\cos\theta)-a(\cos\theta-\cos^2\theta)$$

Values of this function for several values of θ are plotted as abscissae in FIG. 8, for a specific example where a=3.5 inches, b=6 inches. The ordinates are corresponding values of D.

Since D is the vertical displacement of the image point as shown in FIG. 6, the D axis of FIG. 8 may be regarded as an elevation of the ideal image plane 12 of FIG. 6. It can be seen that the points fall on a line that is almost perfectly straight up to 20° or more, so to the same degree of approximation the displaced focal curve lies in a plane. This means that good preservation of focus results in the plane 12 being scanned is inclined at the angle α from the normal position it occupies in FIGS. 1 or 6.

The specific application of the above compensating method is shown in FIG. 9 wherein the object 12 is inclined at the angle α to the normal position. The axial ray 20 is shown for the center-of-scan position corresponding to the showing in FIG. 1. The same ray 20' is shown at its end-of-scan position as forming an image lying in the inclined plane of the object 12. It is obvious that these teachings may be applied by one skilled in the art where the surface to be scanned is desirably in another plane, such as where the surface is positioned above the mechanism 30, as illustrated in FIG. 4.

As noted, it is often convenient to arrange the surface 12 which is to be scanned at a location normal to the axis of rotation of the mirror structure 30 and above the structure, as shown in FIG. 4. In this case, it is obvious that a mirror may be used in place of the prism 60. On the other hand, a 45°–45° prism 60 may serve as a reflector to put the image plane above the rotor, and a part of the thickness of a compensating block 35 may be contained within the prism.

The sensitivity of the system, as measured by the response of the photocell 50, may vary through the scan as a result of such factors as the change of reflection loss at the surface of the compensating block 35 with the angle of incidence. This variation can be corrected by the use of a compensating mask 36, located at some place in the system between the structure 30 and the object 12 and at a place where the beam diameter is not inconveniently small. By shaping the mask 36 to intercept more light when the beam is in the position of high response and less light when the response is less, the overall sensitivity may be made substantially constant across the scan. As shown, the mask 36 is formed to intercept the light of the returning beam identified by 40 and 41. However, it could be placed in the illuminating beam, or both.

The sensitiivty or efficiency of the scanning system may vary through the scan for various reasons and therefore may not be easy to calculate in advance. It is usually preferable to design the compensator mask 36 experimentally to occlude a varying amount of the beam in different positions according to the amount by which the sensitivity or response exceeds that of the weakest point or least responsive scan position. Two compensator arrangements are shown in FIGS. 10 and 11, with each of these figures viewing a compensator from the left into the beam of the scanner as shown in FIG. 1. The keystone-shaped figures of FIGS. 10 and 11 diagrammatically represent the cross-section of the returning beam as defined by the rays which will pass the aperture in the mask 45, at different positions in the plane of the compensator. The masks 21 and 45 are preferably formed with an aperture of this configuration in order to use all the light possible from a mirror surface 32 that will not be intercepted by a mirror edge and that will not miss the mirror. Obviously, other aperture configurations may be used with less efficiency.

The beam is lower at the sides or ends than at the center because of the displacement D' shown in FIG. 6. The cross-section of the beam is also rotated because of the reflection from the rotating mirror 32. The response of the system is usually strongest at the center, so light must be reduced in order to obtain equal response throughout the scan. This is done in FIG. 10 by shaping the opaque compensator mask 36 so that it projects farther into the beam at the center than elsewhere, and little or none at the ends of the scan. The parts of the beam which are occluded in the different positions of the beam are shown by the broken lines.

The compensator arrangement of FIG. 10 is satisfactory where the rotating mirror structure 30 is symmetrical. However, if appreciable differences exist in the angles of the reflector elements 32, or in their distances from the axis of rotation, there will result corresponding differences in the position of the line of scan and in the height of the beams going to or from the elements 32. This would result in varying amounts of light being occluded as the beam positions vary with respect to the mask 36 and, at a given point in the scan, response would be stronger when the scan is made by one mirror 32 than when it is made by another. This undesirable effect is reduced and substantially eliminated by occluding light from within the beam rather than at one edge of the beam, so that if the beam shifts position from one scan to another, the part of the beam moving under the compensating area in the one instance will be nearly equalled by the part emerging from it.

In FIG. 11 is shown a transparent, plane-parallel support 70 which has an opaque scattering or occluding portion 71 formed thereon to intercept the beam in varying amounts according to the position thereof, substantially through the center of the beam. It is within the scope of this invention to employ a compensator which has a light transmission greater than zero or to deviate a part of the light by simple refraction, diffusion, or scattering.

The system described thus far is effective to produce a succession of curved scans along a scan line I from one side of the object 12 being scanned to the other, resulting in a curved trace with the concavity facing downwardly or in the direction of the inclination of the mirror surfaces. It is obvious to one skilled in the art that the second dimension of scanning may be effected by moving the object transversely to the scan I, or by mounting the entire scanning system on a suitable carriage arrangement and moving the scanning system at a rate which may be correlated to the angular rate of the mirror structure and the number of effective surfaces in order adequately to cover the desired area. Reference may be had to FIG. 12 wherein there is disclosed a further system for effecting the second dimension of scan by moving a single element of the scanning system.

In FIG. 12, a mirror 75 is shown as being positioned normal to the surface of the object 12 which is to be scanned. The axis 33 of the rotating mirror structure is inclined to the plane of the object 12. In this example, the axis 33 is inclined at 45°. The mirror structure 30 is inverted on the axis. The arrangement of the mirror 75 with respect to the object 12 is such that when the mirror is moved parallel to itself, such as to the position 75' shown in outline form, the optical path length between the active surface 32 and the object 12 remains constant while the image is moved from an initial position 80 to a position 81.

The arrangement of FIG. 12 also consists of a further embodiment for the utilization of the teachings of the invention as applied to the tilting of the plane of the object at the angle α, as described in detail in connection with FIGS. 8 and 9. If ideal compensation were provided by the ratio a/b, the resulting trace would lie in a plane perpendicular to the beam from the mirror 32, and therefore would lie in this illustration at 45° to the plane of the surface 12, in FIG. 1. Maintenance of focus results in this embodiment by the choice of a and b such that α equals 45°. Thus, focus is maintained by the proper selection of a/b so that the plane of the object 12, being inclined at 45° to the perpendicular of the beam, coincides with the angle α.

The apparatus of FIG. 12 accordingly provides an inexpensive and uncomplicated arrangement by which the second dimension of scanning may be effected by moving a single optical element while maintaining focus while employing what otherwise would be a less-than-ideal ratio of a/b.

It is therefore seen that this invention provides a mechanical optical scanning system for effecting a line trace of an image and for maintaining the focus of the scan throughout the length of the scan. The teachings of the invention may be applied to any system wherein a surface is to be scanned and either intelligence applied to or derived from the surface. Therefore, the system of this invention is particularly adapted for use as the scanning system in the above-mentioned copending application of Young for measuring the quantity and percentage of dark areas or trash in a cotton sample. The system may also be used for illuminating by a flying spot or for developing a flying image from a surface which is generally illuminated. The system is versatile in that where it is not convenient to maintain the ratios of optical path lengths providing the most nearly perfect compensation, other ratios may be employed out of considerations of design together with the use of one of the compensating arrangements for assuring that the trace lies in substantial coincidence with a planar surface.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An optical scanning system for maintaining focus of a scan throughout the length of the scan, comprising means defining an object point, an image forming lens positioned with respect to said object point forming an image point thereof, a scan producing reflector having its surface interposed in the light path between said lens and one of said points, means mounting said surface for rotational movement about an axis lying generally in a direction corresponding to the direction of the light path between said lens and said surface, said surface being inclined at an included angle of more than 0° and less than 90° to said axis for directing light rays between said lens and said one of said points, the distance from said axis of the region of incidence therewith of any given ray through said lens being related with the distance between said region and said one of said points so that the change in length of light path between said lens and said surface upon the rotation of said surface about said axis is substantially offset by a corresponding but opposite change in light path length between said surface and said one of said points.

2. The optical scanning system of claim 1 in which the sensitivity thereof varies throughout the scan, further comprising a compensating mask positioned in the light path between said surface and said one of said points having means positioned to occlude varying amounts of light at different places in said scan in accordance with the amount by which the sensitivity at any position in the scan exceeds the sensitivity of the least sensitive scan position.

3. An optical scanning system for defining a scan element and causing it to move in a path across a generally planar surface and for maintaining focus of the element throughout the length of the scan, comprising a point source, a lens interposed within the light path between said object and said source and effective to project an image of said source onto said object, a planar scanning reflector surface interposed in the light path between said lens and said source and mounted for rotational movement about an axis parallel with the optical center from said source to said lens with said surface being inclined at approximately forty-five degrees to the axis of rotation for directing said light path from said source in a direction radially of said axis to said object, and the distance from said axis of the region of incidence therewith of any given ray through said lens being related with the distance between said region and said object being scanned so that the change in length of the light path between said reflector element surface and said source with the rotation of the reflector element being substantially offset by a corresponding but opposite change in the length of light path from the reflector surface to the object being scanned.

4. An optical scanning system for maintaining focus of a scan on a generally planar object throughout the length of the scan, comprising means defining an object point, projecting lens positioned with respect to said object point forming an image point thereof, a rotating reflector structure having a plurality of scan producing reflector surfaces successively interposed in the light path between said lens and one of said points, means mounting said structure for rotational movement about an axis lying generally in a direction corresponding to the direction of the light path between said lens and one of said surfaces, each of said surfaces being inclined at an included angle of more than 0° and less than 90° to said axis for directing light rays between said surfaces and said one of said points, the distance from said axis of the region of intersection on any one of said surfaces with any given ray through said lens being related with the distance between said region of intersection and said one of said points so that the change in length of light path between said lens and said each of said surfaces upon the rotation of said surfaces is substantially offset by a corresponding but opposite change in light path length between said surfaces and said one of said points.

5. An optical scanning system for maintaining focus of a scan throughout the length of the scan, comprising means defining an object point, a projecting lens positioned with respect to said object point forming an image point thereof, a scan producing reflector surface interposed in the light path between said lens and one of said points, means mounting said surface for rotational movement about an axis lying generally in a direction corresponding to the direction of the light path between said lens and said surface, said surface being inclined at an inclined angle of more than 0° and less than 90° to said axis for directing light rays between said surface and said one of said points, the distance from said axis of the region of incidence on said surface with any given ray through said lens being related with the distance between said one of said points and said region of incidence so that the change in length of light path between said lens and said surface partially offsets the change in light path length between said surface and said one of said points resulting in a curved trace with the concavity thereof facing said surface and a block of material having an index of refraction greater than the surrounding medium interposed in the light path between said surface and said one of said points and having a thickness sufficient to rectify said curved trace into substantially a planar trace.

6. An optical scanning system for maintaining focus of a scan on a planar surface throughout the length of the scan, comprising means defining an object point, a projecting lens positioned with respect to said object point forming an image point thereof, a scan producing reflector surface interposed in the light path between said lens and one of said points, means mounting said reflector surface for rotational movement about an axis lying generally in a direction corresponding to the direction of the light path between said lens and said reflector surface, said reflector surface being inclined at an inclined angle of more than 0° and less than 90° to said axis for directing light rays between said reflector surface and said one of said points and being mounted for rotation to effect a scan of said one of said points on said surface, the radial distance from said axis of the region of incidence on said reflector surface with any given ray through said lens being related with the distance between said one of said points and said region of incidence so that the change in length of the light path between said reflector surface and said one of said points results in a curved trace lying substantially in a plane which is oblique to a plane normal to the axial ray reflected from said reflector surface, and said planar surface being positioned in a plane substantially coincident with the plane of said curved trace.

7. A mechanical-optical scanning system, comprising means defining a point source, a lens projecting an image of said source, a rotating scanning mirror structure having an axis of rotation generally aligned with the optical path between said source and said lens and having a plurality of reflecting portions effectively inclined at an included angle of more than 0° and less than 90° to said axis of rotation and movable successively through said path to direct rays from said lens generally radially of said axis onto an object to be scanned for effecting successive scans of the image of said point source across such object, the region of incidence of distance between the one of said reflecting portions with said light path and said object being related with the radial distance of said region of incidence from said axis so that the change in effective length of light path between said one portion and said object is at least partially offset throughout the length of said scan by a compensating change in length of path between said one portion and said source, and a system responsive to the variations in the intensity of the light reflected from said image including a second lens positioned to receive reflected light from said image through said mirror structure, and a photoelectric transducer positioned to receive light from said second lens to convert the variations in the intensity thereof into an electric signal.

8. A mechanical-optical scanning system for scanning a plane and maintaining focus throughout the scan, comprising means defining an object point, a lens forming an image of said object point, a rotating scanner having an axis of rotation generally aligned with the optical path between said object point and said lens and having a plurality of planar reflecting surfaces, means mounting each said surface effectively inclined at an angle $\beta$ to said axis of rotation, said surfaces being movable successively through said path to direct rays from said lens generally outwardly of said axis onto said plane for effecting a scan of said image in a line across said plane, the change $D'$ in distance measured between the axial ray's point of incidence on one of said reflecting surfaces and said object point as a result of the rotation of said one surface from a normal position through an angle $\theta$ being defined by the formula $D=a(1-\cos\theta)/\tan\beta$ where $a$ is the radial distance of said incidence point on said surface measured from said axis of rotation, the change $E$ in distance $b$ between said axial ray's point of incidence and said plane as a result of said rotation through the angle $\theta$ being defined by the formula $E=b(1/\cos\theta - 1/\sin 2\beta)$, and the ratio of $a$ to $b$ being such that the difference between $D'$ and $E$ approximates 0 at at least one point in the scan other than at a point where $\theta=0$.

9. The scanning system of claim 8 wherein the ratio of $a$ to $b$ is such as to provide a curved trace concave toward said scanner, and a block of transparent material having an index of refraction greater than that of the surrounding medium interposed in the light path between said scanner and said plane and having a thickness and refractive index effective to rectify said curved image into an image lying in said plane.

10. The scanning system of claim 8 wherein the ratio of $a$ and $b$ is such as to provide a curved trace which lies in a plane oblique to the normal to the axial ray reflected from said scanner, and wherein said scanned plane is inclined to lie substantially in said oblique plane.

11. In a flying scanner wherein a changing small element is defined in a scan line on a surface and where the optical efficiency of the system varies over the length of the scan, the means for compensating for such variation including a mask positioned in the light path in spaced relation to said surface and having means positioned to occlude varying amounts of the light at different places in said scan line according to the variations in efficiency.

12. The scanner of claim 11 wherein said mask is opaque and having an edge thereof positioned to occlude selected portions of the light according to said variations in efficiency.

13. The scanner of claim 11 wherein said compensating means includes a transparent support, and an opaque region on said support proportioned to occlude a varying amount of said light at different places in said scan line substantially through the center thereof according to said variations in efficiency.

14. In a scanning system for effecting a line trace of an image with respect to an object and for causing said trace to move in a second dimension over an area, the improvement comprising a rotating mirror structure having a plurality of reflecting surfaces, a lens projecting an image onto successive reflecting surfaces of said structure for conversion into a succession of scans of said image, a reflector normal to said surface interposed in the light path from said mirror structure for directing said successive traces of said image onto said object, and means moving said reflector to positions parallel to itself to effect the scanning of said surface in said second dimension while maintaining constant the instantaneous light path length between said object and said rotating mirror surfaces for any position of said reflector.

References Cited
UNITED STATES PATENTS

| | | |
|---|---|---|
| 2,124,802 | 7/1938 | Wallace _____ 88—14 |
| 2,419,459 | 4/1947 | McDowell et al. ____ 250—236 X |
| 2,640,866 | 6/1953 | Powell. |
| 2,746,749 | 5/1956 | Huck _____ 88—14 |
| 2,769,374 | 11/1956 | Sick _____ 250—230 X |
| 2,859,653 | 11/1958 | Blackstone et al. |
| 3,028,793 | 4/1962 | Bousky et al. _____ 88—57 |
| 3,142,224 | 7/1964 | Andrews et al. _____ 88—57 |
| 3,149,968 | 9/1964 | Stephens _____ 250—237 |
| 3,264,480 | 8/1966 | Zuck et al. _____ 250—236 X |

WALTER STOLWEIN, *Primary Examiner.*

RALPH G. NILSON, *Examiner.*

M. A. LEAVITT, *Assistant Examiner.*

UNITED STATES PATENT OFFICE
CERTIFICATE OF CORRECTION

Patent No. 3,360,659                                    December 26, 1967

Clinton J. T. Young

It is certified that error appears in the above identified patent and that said Letters Patent are hereby corrected as shown below:

Column 5, line 9, "(1/cos θ" should read -- (1/cos θ) --; line 39, "shortened by E/sin 2." should read -- lengthened by E/sin 2β. --; line 56, "compensations" should read -- compensation --. Column 11, line 23, cancel "region of incidence of distance between the one of said" and insert -- distance between the region of incidence of one of said --; line 59, "(1/cos θ-1" should read -- (1/cos θ-1) --.

Signed and sealed this 25th day of November 1969.

(SEAL)
Attest:

Edward M. Fletcher, Jr.                            WILLIAM E. SCHUYLER, JR.
Attesting Officer                                        Commissioner of Patents